United States Patent [19]

Mori

[11] Patent Number: 4,748,455

[45] Date of Patent: May 31, 1988

[54] SYSTEM FOR DRIVING A THERMAL PRINT HEAD

[75] Inventor: Masaaki Mori, Kawasaki, Japan

[73] Assignee: Ricoh Company, Ltd., Tokyo, Japan

[21] Appl. No.: 858,534

[22] Filed: Apr. 28, 1986

Related U.S. Application Data

[63] Continuation of Ser. No. 523,037, Aug. 12, 1983, abandoned.

[30] Foreign Application Priority Data

Jan. 20, 1983 [JP] Japan .................................. 58-7602

[51] Int. Cl.[4] ............................................ G01D 15/10

[52] U.S. Cl. ................................ 346/76 PH; 400/120

[58] Field of Search .......................... 346/76 PH, 154; 400/120; 219/216 PH; 250/318; 364/518, 519; 358/296, 80, 257; 307/265–267, 234

[56] References Cited

U.S. PATENT DOCUMENTS 4,309,712 1/1982 Iwakura ......................... 346/76 PH 4,347,518 8/1982 Williams et al. ............... 346/76 PH 4,364,063 12/1982 Anno et al. .................... 346/76 PH 4,415,908 11/1983 Sugiura .......................... 346/76 PH

*Primary Examiner*—Arthur G. Evans

*Attorney, Agent, or Firm*—Cooper & Dunham

[57] ABSTRACT

A system for driving a thermal print head including a plurality of heat-producing elements which are activated selectively in accordance with digital image data obtained from an analog image signal is provided. In one aspect, the driving system is so structured to insert additional data between any two adjacent image data whenever the space between the two exceeds a predetermined level thereby allowing to maintain the dot density at constant when printed. In another aspect, the driving system controls the time period of activation of each of the heat-producing elements in accordance with preheat control data obtained by carrying out AND processing between each of the digital image data of one print line and the corresponding each of the digital image data of the next following print line. In a further aspect, the present driving system has a structure such that a reference point in a print line may be set at a desired location along the print line.

10 Claims, 9 Drawing Sheets

Fig. 7
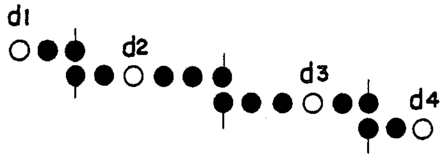
Fig. 8
PRIOR ART
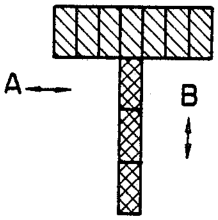
Fig. 9
PRIOR ART
| | a | b | c | d |
|---|---|---|---|---|
| n | 1 | 1 | 0 | 0 |
| n+1 | 1 | 0 | 1 | 0 |
Fig. 11
| | a | b | c | d |
|---|---|---|---|---|
| n | 1 | 1 | 0 | 0 |
| n' | 0 | 0 | 1 | 1 |
| n" | 0 | 0 | 1 | 0 |
| n+1 | 1 | 0 | 1 | 0 |
Fig. 10
PRIOR ART
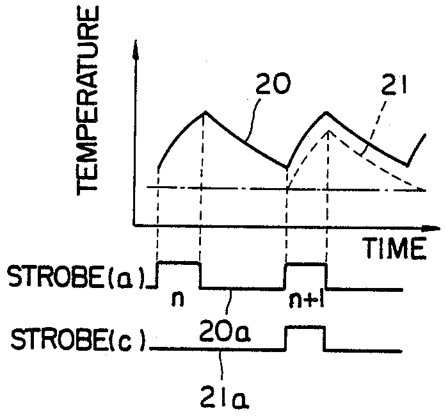
Fig. 14
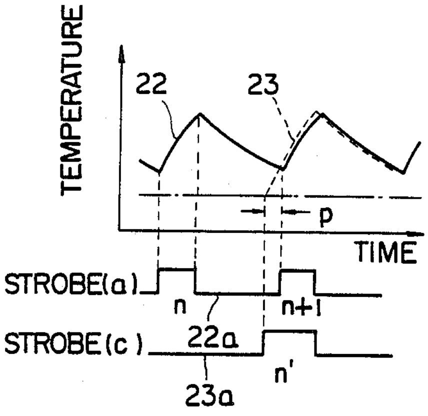

SYSTEM FOR DRIVING A THERMAL PRINT HEAD

This is a continuation application from application Ser. No. 523,037 filed Aug. 12, 1983, now abandoned.

BACKGROUND OF THE INVENTION

1. Field of the Invention

This invention generally relates to thermal printers for printing desired characters and images on heat-sensitive paper directly or on plain paper through heat-resistive ribbon using a thermal print head, and, in particular, to a system for driving such a thermal print head.

2. Description of the Prior Art

Thermal printers are well known in the art. Typically, a thermal printer includes a thermal print head provided with a plurality of heat-producing elements such as electrically resistive elements arranged in a single array at a predetermined pitch and a driving circuit to supply driving current pulses to the array of heat-producing elements selectively in accordance with an image signal supplied thereto. A sheet of heat-sensitive paper is moved with respect to and in contact with the thermal print head so that desired portions of the paper are "burned" or darkened thereby forming a reproduced image in the form of dot matrix.

There has been recently developed a direct-drive type thermal printer in which a driving circuit for driving the thermal print head, which generally includes switching transistors each connected to the corresponding one of the heat-producing elements and which is fabricated in the form of an IC, is mounted integrally and directly on the thermal print head. Such a driving circuit typically includes serial-to-parallel shift registers which serially receive image data for a single line and then supply the thus received image data to the heat-producing elements in parallel. In such a structure, latches are commonly provided between the shift registers and the heat-producing elements in order to increase operational speed.

It is true that various advantages may be obtained by using such a direct-drive type thermal printer. However, it is also true that there are some areas which need to be further refined and which need to be improved in order to obviate some disadvantages which are inherent in the direct-drive type thermal printer. For example, in order to obtain a digital image signal which may be applied to the thermal print head for carrying out thermal printing operation, analog image information must first be converted into digital image data with the use of an analog-to-digital A/D ) converter by scanning an original.

In such thermal printers, use is commonly made of a fixed sampling rate so as to allow to carry out a high-speed printing operation. With such a structure, however, as shown in FIG. 1, although no problem arises as long as the amplitude variation of input analog signal is rather small as indicated by a portion A, in which the dot density is reasonably high to allow easy recognition of a reproduced image, a poor reproduced image will result if it has a larger amplitude variation as indicated by a portion B, in which the dot density is too low and thus it is difficult for a viewer to recognize a reproduced image. Accordingly, a simple increase in printing speed with a fixed sampling rate will produce a reproduced image of irregularly varying image densities since the dot density will vary depending upon the amplitude variation of analog image signal obtained by scanning an original. Other disadvantages will also loom large when a high-speed printing operation is desired in such thermal printers which need to be obviated as will become clear as one reads through this specification. Moreover, it is also important to devise a means for prolonging the service life of a thermal print head because it can easily lead to damages or malfunctioning due to repetitive application of heat.

SUMMARY OF THE INVENTION

The disadvantages of the prior art are overcome with the present invention and a novel system for driving a thermal print head is hereby provided.

In accordance with one aspect of the present invention, there is provided a system for driving a thermal print head having a plurality of heat-producing elements which are selectively driven in accordance with digital image data obtained by sampling an input analog image signal at a fixed rate, and the driving system is so structured that the dot density remains substantially at constant irrespective of the magnitude of amplitude variation of the analog image signal. In order to keep the dot density of printed image at constant, additional dots are inserted with the timing of the clock signal used in sampling the analog image signal whenever the two adjacent dots of the digital image data are spaced apart from each other beyond a predetermined level.

In accordance with another aspect of the present invention, there is provided a system for driving a thermal print head having a plurality of heat-producing elements which are arranged in a line and selectively driven in accordance with digital image data, wherein the pulse width of a driving current signal to be selectively applied to the heat-producing elements in accordance with the digital image data is controlled on the basis of the conditions of the digital image data of the last preceding line and the conditions of the digital image data of the current line to be printed. With such a structure, a printing speed may be significantly increased without causing irregularities in density in resulting images.

In accordance with a further aspect of the present invention, there is provided a system for driving a thermal print head having a plurality of heat-producing elements which are arranged in an array and selectively driven in accordance with digital image data, wherein a base line in printing is shifted in position along the array of heat-producing elements for one or more batches of printing thereby allowing to attain uniform frequency of use throughout all of the heat-producing elements and thus to prolong the service life of the thermal print head.

Therefore, it is a primary object of the present invention to provide an improved system for driving a thermal print head for use in thermal printers.

Another object of the present invention is to provide a thermal print head driving system capable of printing an image of excellent quality.

A further object of the present invention is to provide a thermal print head driving system capable of driving a thermal print head at an increased speed without causing any adverse effects such as irregularlity in image density.

A still further object of the present invention is to provide a thermal print head driving system which can suppress the effect of thermal hysteresis even if printing speed is increased.

A still further object of the present invention is to provide a thermal print head driving system which allows to prolong the service life of a thermal print head.

A still further object of the present invention is to provide a thermal printing system and method which allows to obtain a printed image of high quality at all times.

Other objects, advantages and novel features of the present invention will become apparent from the following detailed description of the invention when considered in conjunction with the accompanying drawings.

BRIEF DESCRIPTION OF THE DRAWINGS

FIG. 7 is a schematic illustration showing one printed example with additional dots, indicated by black dots, inserted between the two adjacent dots of original digital image data;

FIGS. 8 through 10 are schematic illustrations for explaining the effect of thermal hysteresis when thermal printing is carried out by means of a typical prior art diving system;

FIG. 11 is a schematic illustration which is useful for explaining the principle of a further embodiment of the present invention which can avoid the effect of thermal hysteresis;

FIG. 14 is a graph illustrating the temperature characteristic of the thermal print head when driven by the system shown in FIG. 12;

DESCRIPTION OF THE PREFERRED EMBODIMENTS

Figure 1:
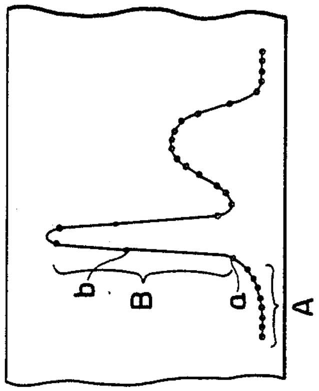
Fig. 1 PRIOR ART
FIG. 1 is a schematic illustration showing an example of an image printed by a thermal print head in accordance with a typical prior art driving method.
Figure 2:
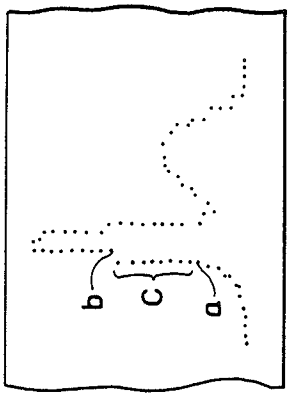
FIG. 2 is a schematic illustration showing an image printed by a thermal print head in accordance with the thermal print head driving system embodying the present invention.

Referring now to FIG. 2, there is shown an example of a printout which has been printed in accordance with one embodiment of the present invention. As shown, a series of additional dots indicated by c has been inserted between the two original dots a and b which are widely spaced apart from each other. As shown in FIG. 2, additional dots are appropriately inserted between the other original dots so that the dot density of a resulting image may be made uniform throughout the image.

Figure 3:
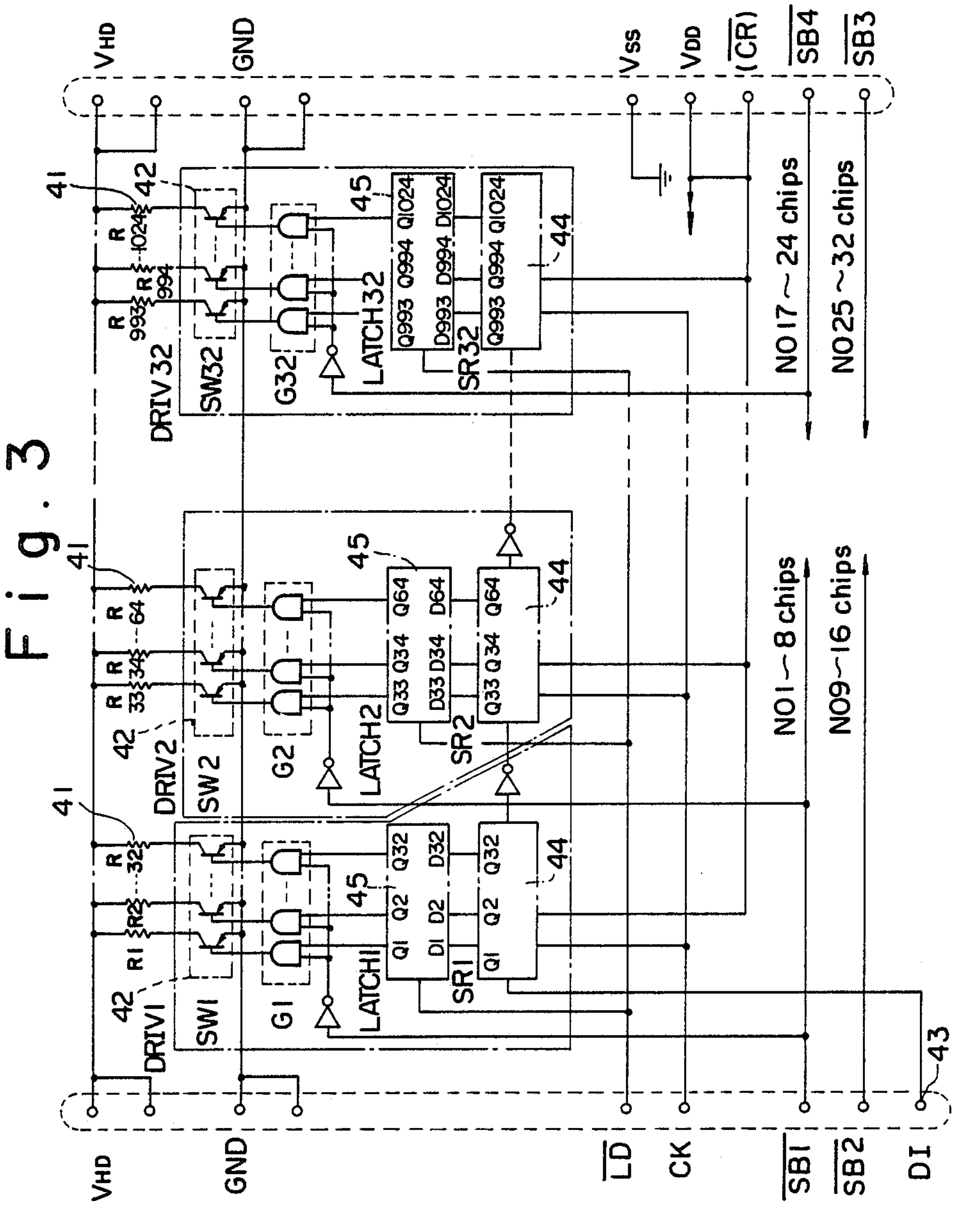
FIG. 3 a schematic illustration showing the detailed structure of a direct-drive type thermal print head which may be advantageously driven by a driving system of the present invention.

FIG. 3 is a schematic illustration showing the overall structure of a typical direct-drive type thermal print head which may be advantageously used with a driving system of the present invention. As shown, the thermal print head includes a plurality, or 1,024 in the illustrated example, of electrically resistive elements 41 or R1 through R1024, each of which produces heat when a driving current pulse is passed therethrough and which are arranged linearly at a predetermined pitch. Also provided are 32 driver modules DRIV1 through DRIV32 which are arranged side-by-side along the array of electrically resistive elements as connected to the corresponding 32 electrically resistive elements 41. Each of the driver modules DRIV1 through DRIV32 includes 32 switching transistors 42 (SW), 32 AND gates G, a 32-bit latch 45 (LATCH) and a 32-bit serial-in-parallel-out shift register 44 (SR), and it is typically constructed in the form of a one-chip I.C. Each of the switching transistors 42 has its collector connected to one end of the corresponding electrically resistive element 41, whose the other end is connected to a predetermined high voltage $V_{HD}$, its emitter connected to ground voltage GND and its base connected to the output of the corresponding AND gate G, whose one input is connected to receive a strobe signal $\overline{SB}$ through an inverter and the other input connected to the corresponding output of the latch 45. The latch 45 has 32 inputs each of which is connected to the corresponding one of 32 outputs of the corresponding shift register 44. The latch 45 has also an input to receive a load signal $\overline{LD}$ and the shift register 44 has an input to receive digital image data DI through a terminal 43.

In operation digital image data DI comprised of 0s and 1s for a single line are first supplied into the shift registers SR1 through SR32, and, when the shift registers SR1 through SR32 are all supplied with digital image data, these digital image data are transferred to the corresponding latches at the timing of a load signal $\overline{LD}$. Then strobe signals $\overline{SB1}$ through $\overline{SB4}$ are supplied to the AND gates G1 through G32 to have the switching transistors 42 turned on selectively for a predetermined time period, thereby allowing a current to flow through the electrically resistive elements 41 selectively.

In the above-described structure for driving a thermal print head provided with a plurality of resistive elements, the clock signal CK to be applied to each of the shift registers SR1 through SR32 for shifting data therethrough may be set at several MHz and the interval of each of the strobe signals $\overline{SB1}$ through $\overline{SB4}$ may be set at several milliseconds, thereby allowing to carry out a high-speed printing operation. In this case, an analog image signal obtained by scanning an original must be converted into digital image data by an A/D converter at the sampling rate of several milliseconds in accordance with the interval of each of the strobe signals $\overline{\text{SB1}}$ through $\overline{\text{SB4}}$ and the thus A/D converted image data are then applied to the input terminal DI of the thermal print head.

With such a structure, however, as mentioned before, if the analog image signal changes its level or amplitude significantly as well as rapidly, printed dots will be widely spaced apart from each other so that a resulting image will appear choppy and thus poor in quality. It is true that the interval of each of the strobe signals $\overline{\text{SB1}}$ through $\overline{\text{SB4}}$ may be made shorter to increase the sampling rate thereby making the dot density relatively uniform throughout the printed image. However, since heat-sensitive paper required a certain amount of energy, thermal energy in this case, in order to form a "burn" or darkened dot thereon, there is a limit in shortening the interval of each of the strobe pulses $\overline{\text{SB1}}$ through $\overline{\text{SB4}}$. Accordingly, a simple reduction in the interval of each strobe signal would not be advantageous.

Under the circumstances, in accordance with the present invention, there is provided a structure in which additional dots are inserted at the timing in synchronism with the sampling rate into the space between the digital image data obtained by sampling an analog image signal at a predetermined sampling rate. Thus, in accordance with the present invention, there is no need to reduce the interval or pulse width of a strobe signal to be applied to a thermal print head or to increase the sampling rate of the A/D converter for converting an analog image signal obtained by scanning an original into digital image data. Therefore, in accordance with the present invention, the spacing between printed dots may be maintained substantially at constant at all times thereby allowing to obtain a printed image of uniform density without irregularities.

Figure 4:
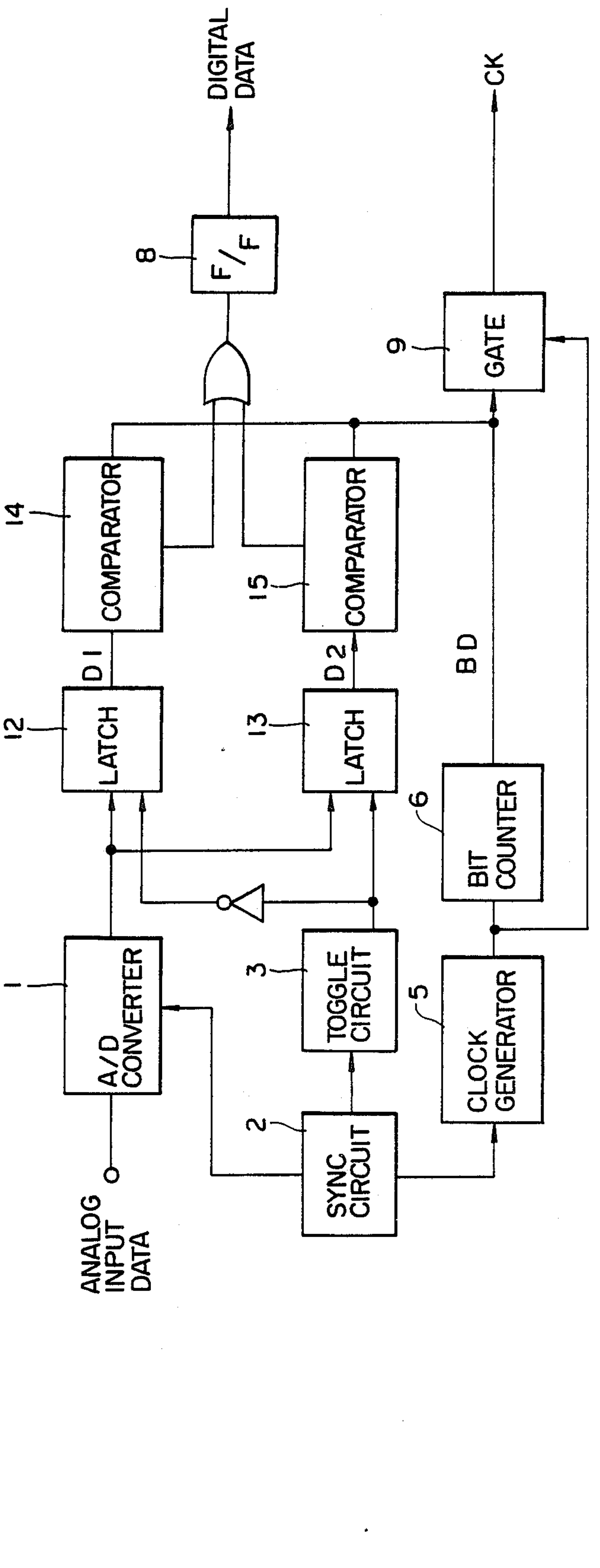
FIG. 4 is a block diagram showing one embodiment of the present thermal print head driving system, which can insert additional dots to keep the dot density at constant.

FIG. 4 illustrates in block form the structure of one embodiment of a thermal print head driving system which is capable of inserting additional dots as necessary to maintain the printed dot density at a desired level. The driving system of FIG. 4 includes an analog-to-digital (A/D) converter 1 for converting an analog image signal, supplied thereto, for example, from a scanner which scans an original into digital image data in accordance with the sampling rate which is determined by a sampling signal applied from a sync circuit 2. The system also includes a toggle circuit 3 which extends the sampling signal supplied as an output from the sync circuit 2 and a pair of latches 12 and 13 which are alternately activated by an output from the toggle circuit 3 to receive converted digital image data from the A/D converter 1. The system further includes a clock circuit 5 for supplying a clock signal in response to the sampling signal from the sync circuit 2, a bit counter 6, which counts clock pulses from the clock generator 5 to supply in sequence bit data BD in parallel in accordance with its count and counts up to the number of picture elements or electrically resistive elements for a line, a pair of comparators 14 and 15, which compare the bit data BD from the bit counter 6 with digital image data D1 and D2 supplied from the latches 12 and 13, respectively, and a flipflop 8 which is set or reset in response to an output from the comparators 14 and 15 and when set supplies its output as digital image data to the input terminal D1 of the thermal print head shown in FIG. 3. Furthermore, there is provided a gate 9 which functions such that while the bit counter 6 carries out a counting operation in association with the clock signal supplied from the clock generator 5, the clock signal is allowed to pass through the gate 9 to be applied to each of the shift registers SR1 through SR32 as a clock signal for shifting data therein.

In operation, when an analog image signal is applied, it is converted into digital image data at a predetermined sampling rate by the A/D converter 1, and the thus converted digital image data are alternately latched into the latches 12 and 13 bit by bit. At the same time, the clock pulses generated by the clock generator 5 in synchronism with the sampling signal applied to the A/D converter 1 are counted by the bit counter 6. Then, the bit data BD from the bit counter 6 is compared with the data D1 latched in the latch 12 and the data D2 latched in the latch 13 alternately by the comparators 14 and 15. When the bit data BD becomes equal in value to either one of D1 and D2, whichever is smaller, as the bit data BD increments from the value 1, the comparator 14 or 15 finding coincidence between bit data BD and data D1 or D2 supplies a coincidence signal which is then supplied to the flipflop 8 to cause it to be set. On the other hand, when either one of the comparators 14 and 15 has found a coincidence between bit data BD and data D1 or D2, whichever is larger, the flipflop 8 is reset.

Figure 5:
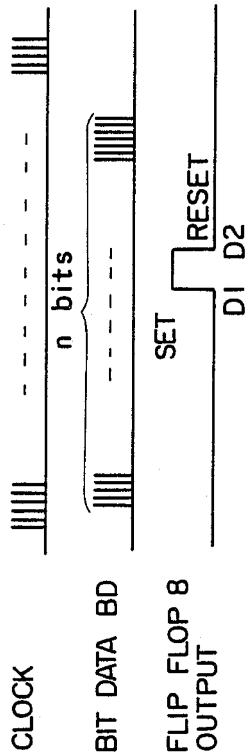
FIG. 5 a timing diagram which is useful in understanding the operation of the structure shown in FIG. 4.

Under the condition, while the flipflop 8 is in the state of being set, its output supplies a Hi signal thereby allowing to insert an appropriate number of black level or dot data between data D1 and D2. Upon insertion of additional dot data between data D1 and D2, the next data is supplied into the latch 12. Then, the similar operation takes place between the data just loaded into the latch 12 and the data previously loaded into the latch 13. FIG. 5 is a timing chart which is useful for understanding the operation of the driving system shown in FIG. 4. Incidentally, when the driving system of FIG. 4 is to be used with the thermal print head of FIG. 3, the bit counter 6 is so structured to carry out a counting operaton up to n=1,024.

Figure 6:
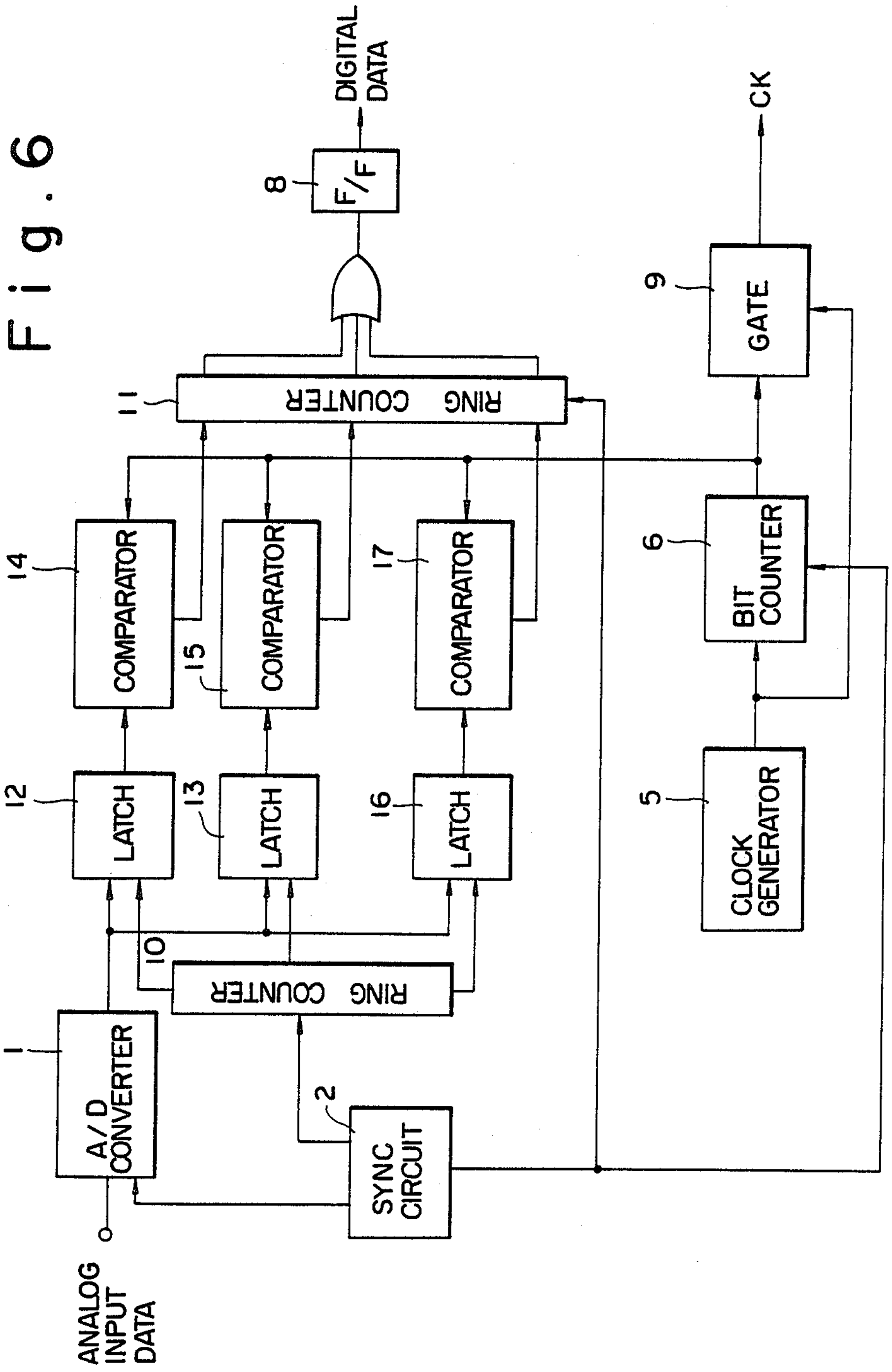
FIG. 6 is a block diagram showing another embodiment of the present thermal print head driving system, which can insert additional dots to keep the dot density at constant.

FIG. 6 shows in block form another embodiment of the present thermal print head driving system, which is similar structurally in many respects to the previous embodiment shown in FIG. 4, excepting that there are provided additional elements such as a latch 16, a comparator 17 and two ring counters 10 and 11. Stated more in detail, in the structure of FIG. 6 are provided three latches 12, 13 and 16 and three comparators 14, 15 and 17, and the loading of data per bit into each of the latches 12, 13 and 16 is carried out in sequence at the timing determined by an output from the ring counter 10 which is synchronized with the sampling signal. On the other hand, the selection of an output from each of the comparators 14, 15 and 17 is carried out in sequence by an output from the ring counter 11 which is synchronized with the sampling singal.

With such a structure, while a comparison is being made by the comparators 14 and 15 with the data D1 stored in the latch 12 and the data D2 stored in the latch 13, the next following data D3 may be stored into the latch 16. Thus, upon completion of insertion of additional data between the data D1 and D2, the next operation between the data D2 and D3 may follow immediately. That is, in the embodiment of FIG. 6, the supply of an analog image signal and thus the loading operation for loading data into one of the latches 12, 13 and 16 and the transfer operation for transferring data from one of the latches 12, 13 and 16 to the input terminal DI of the thermal print head may be carried out in parallel, which indicates that the structure of FIG. 6 allows to carry out a high speed operation. On the other hand, in the embodiment of FIG. 4, the next following data D3 may be loaded into the latch 12 only after the insertion of additional dot data between the data D1 and D2 latched in the latches 12 and 13, respectively, has been completed. And, thus, in the embodiment of FIG. 4, the supply of an analog image signal as an input to the present driving system and the transfer of processed data to the thermal print head as an output of the present driving system are carried out in sequence, so that it requires an increased amount of time for processing the data for a single line.

FIG. 7 shows a example of a printout which has been printed in accordance with the preferred embodiment of the present driving system. In FIG. 7, the white dots indicated by d1 through d4 are the original dots and the black dots are the additional dots appropriately inserted between the original dots, the number of additional dots being dependent upon the spacing between the two adjacent original dots. In this example, it is to be noted that the additional dots are inserted such that at least two of the additional dots inserted between the two adjacent original dots are overlapping in the auxiliary scanning direction which is the direction of advancement of a sheet of heat-sensitive paper with respect to the thermal print head and which is perpendicular to the main scanning direction determined by the one dimensional array of the electrically resistive elements. This is advantageous because a curved line when printed will appear continuous.

As described before, the direct-drive type themal print head system shown in FIG. 3 can carry out a high-speed printing operation and the printing operation along a line takes a relatively short period of time in the order of a few milliseconds. As the printing operation for a line is increased to this level, a problem of thermal hysteresis comes into play. That is, as the speed of printing operation is increased, it will reach a point where the printing operation for the next line takes place with the electrically resistive elements which have not been sufficiently cooled. This condition will be better understood when reference is made to FIG. 8, in which the direction indicated by the double-sided arrow A corresponds to the main scanning direction and the direction indicated by the arrow B corresponds to the auxiliary scanning direction. If the printing speed is increased exceedingly, there will be a gradual increase in density along the direction B though no increase in density occurs in the direction A. Such a preferential increase in density is disadvantageous because it will bring about non-uniformity in density in a printed image.

The above-mentioned phenomenon will be analyzed further in detail with reference to FIG. 9. FIG. 9 illustrates the image data to be printed for the two consecutive lines, and "a" through "d" indicates the respective dot positions and "n" and "n+1" indicate the nth and (n+1)th lines, respectively, to be printed. Thus, the situation shown in FIG. 9 indicates that the printing of (1, 1, 0, 0) takes place for the nth line and the printing of (1, 0, 1, 0) takes place for the (n+1)th line with "1" indicating producing a "burn" or black dot and "0" indicating producing no "burn." Under the condition, the dot "a" will receive "1" for the nth and (n+1)th lines and thus it will be heated twice in succession; on the other hand, the dot "c" will receive "0" for the nth line and "1" for the (n+1)th line and thus it will not be heated for the nth line but will be heated for the (n+1)th line.

FIG. 10 graphically illustrates the temperature variation of the dots "a" and "c" under the condition of FIG. 9. As graphically shown, with respect to the dot "a", a driving current pulse or strobe pulse is supplied for each of the nth and (n+1)th lines as indicated by a waveform *20a* so that the temperature of the dot "a" will vary as indicated by a curve 20. On the other hand, with respect to the dot "c", since a driving current signal is supplied only for the (n+1)th line as indicated by a waveform *21a*, the temperature of the dot "c" will vary as indicated by a dotted curve 21, which is somewhat lower in level as compared with the curve 20. For this reason, there will be created a difference in density level depending upon the printing condition for the last preceding line.

A second aspect of the present invention is directed to solve such a problem as just described above. In the preferred mode of this aspect of the present invention, there is provided a system for driving a thermal print head, including a plurality of electrically resistive elements arranged in the form of a single array, comprising a shift register means having a capacity of storing image data for a single line and receiving image data serially; a latch means having a capacity of storing image data for a single line and receiving image data in parallel from said shift register means and transferring the image data to said plurality of electrically resistive elements; means for producing driving duration control data by carrying out AND processing for the two succeeding image data for each of said plurality of electrically resistive elements; and means for controlling the duration of application of a driving current signal to each of said plurality of electrically resistive elements in accordance with said driving duration control data.

The principle of this aspect of the present invention will first be explained with reference to FIG. 11. It is to be noted that identical nomenclature has identical meaning. As shown in FIG. 11, the image data for the nth line comprise (1, 1, 0, 0) and they are temporarily stored in a shift register; on the other hand, the image data for the next following line, (n+1)th line, comprise (1, 0, 1, 0). In FIG. 11, the data indicated by "n'" are the data formed by inverting each of the data indicated by "n" and the data indicated by "n''" are the data formed by carrying out AND processing between the data indicated by "n+1" and the data indicated by "n'" for each of the positions "a" through "d." In the present example, the data for "n''" comprise (0, 0, 1, 0) and thus "1" is present only for the dot position "c." In other words, the existence of "1" in the data "n''" implieso that "1" appears for the first time in the (n+1)th line after the nth line, and, therefore, the data "n''" may be used as driving duration control data for controlling the duration of application of a driving current signal to the corresponding resistive element.

Figure 12:
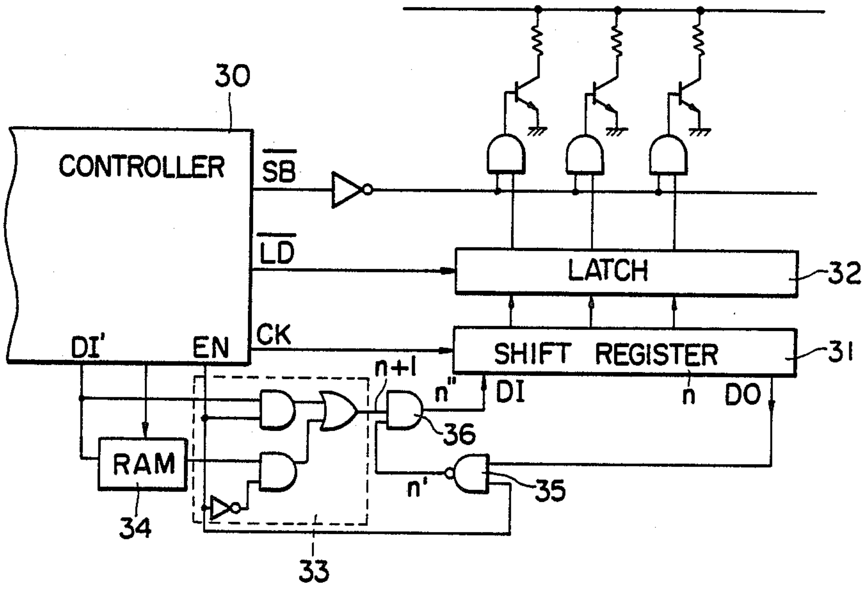
FIG. 12 is a circuit diagram partly in blocks and partly in logic symbols showing one embodiment of the present invention for suppressing the thermal hysteresis effect.
Figure 13:
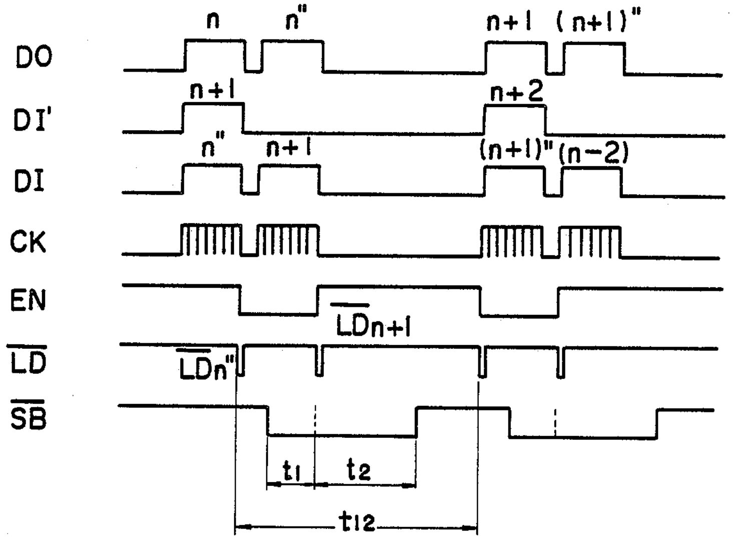
FIG. 13 is a timing chart which is useful for explaining the operation of the system shown in FIG. 12.

FIG. 12 is a schematic illustration showing the overall structure of one embodiment of the thermal print head driving system which can control the duration of application of a driving current signal for printing a current line depending upon the condition of the image data of the last preceding line. FIG. 13 is a timing chart which is useful for understanding the operation of the structure shown in FIG. 12. The system of FIG. 12 includes a controller 30, a serial-in-parallel-out shift register 31, a latch 32, and a gate circuit 33. It is assumed at the outset that the image data for the nth line are already stored in the shift register 31. When the image data for the (n+1)th line are supplied from a terminal DI' of the controller 30, they are fed not only into the gate circuit 33 but also into a RAM 34. Under the condition, a signal EN for controlling the condition of the gate circuit 33 is set "1", so that a NAND gate 35 allows an output, which is comprised of the image data for the nth line, from a terminal DO of the shift register 31 to be passed as inverted in synchronism with a clock signal CK which is supplied from the controller 30 to the shift register 31. Thus, the NAND gate 35 supplies as its output the data "n'" to be applied to one input of an AND gate 36 whose the other input receives the data for the (n+1)th line and whose output supplies the data "n''" to an input DI of the shift register 31.

Upon completion of shifting of the data for a line, a load signal $\overline{LD}$n" is applied to the latch 32 from the controller 30 whereby the data in the shift register 31 are transferred in parallel to the latch 32. Thus, a driving current signal having a duration or pulse width t1 determined by such conditions as the ambient temperature and the temperature of the print head is applied to the electrically resistive elements selectively in accordance with the data now present in the latch 32. Since the data in this case correspond to "n''", only the electrically resistive element corresponding in position to the dot "c" receives a driving current signal and becomes heated.

Then, the signal EN turns to "0", and the data for the (n+1)th line are read out of the RAM 34. In this instance, however, since the output of the gate circuit 35 remains "1", a gate 36 will pass the data for the (n+1)th line as they are into the shift register 31. When all of the data for the (n+1)th line have been inputted into the shift register 31, the controller 30 supplies a load signal $\overline{LD}$n+1 to the latch 32 so that the data now in the shift register 31 are transferred in parallel to the latch 32. Accordingly, during the $t_2$ period of a strobe signal $\overline{SB}$, driving of the resistive elements is controlled in accordance with the data for the (n+1)th line. In this manner, the data "n''" and the data "n+1" are switched during the period of a strobe signal. As a result, the dots "a" and "c" will receive strobe signals 22*a* and 23*a*, respectively, as indicated in FIG. 14, and the temperature of each of the dots "a" and "c" will vary as indicated by waveforms 22 and 23, as also shown in FIG. 14.

As an alternative form, the RAM 34, the gate circuit 33 and the remaining gates 35 and 36 may be incorporated into the controller 30, if desired.

Figure 15:
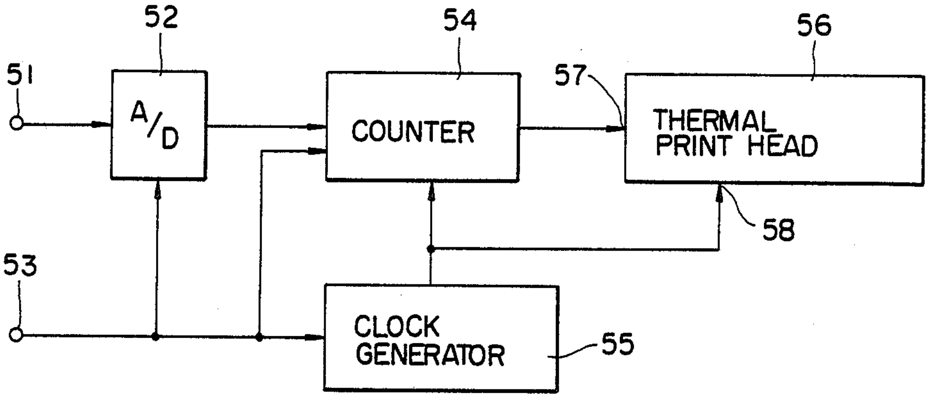
Fig. 15 PRIOR ART
FIG. 15 is a block diagram showing a typical prior system for driving a thermal print head.

Now, a description will be made as to a further aspect of the present invention which is particularly directed to equalize the frequency of use of each of the electrically resistive elements as much as possible thereby allowing not only to produce a printed image of excellent quality but also to prolong the service life of the thermal print head. FIG. 15 shows in block form a typical prior art system for driving a thermal print head 56 of the type having the structure shown in FIG. 3. As described in detail before, the thermal print head of FIG. 3 is the so-called direct-drive type thermal print head which includes integrally mounted I.C. chips for driving a plurality of heat-producing or more commonly electrically resistive elements selectively in accordance with image data. As shown in FIG. 3, the I.C. chip generally includes a predetermined number of switching transistors SW and gate circuits G, a latch LATCH having a predetermined number of bits and a shift register SR having a predetermined number of bits.

In the structure of FIG. 15, an analog image signal obtained by scanning an original is applied to an input terminal 51, and, thus, the analog image signal is supplied to an A/D converter 52 where the analog image signal is converted into digital image data, which, in turn, are loaded into a counter 54 at the timing of a line sync signal which is applied to another input terminal 53. The line sync signal is also applied to a clock generator 55 which then supplies a clock signal to the counter 54 so that the count of the counter 54 is counted down in synchronism with the clock signal from the clock generator 55. When the count of the counter 54 has reached "0", the counter 54 supplies "1" to its output terminal which is connected to a input terminal 57 of the thermal print head for receiving image data. The clock signal is also applied to a clock input terminal 58 of the thermal print head 56 to establish timing between various elements in the thermal print head 56. In such a structure, there is a chance that a particular dot or dots are used frequently especially in the case where the thermal print head is used for recording data which change in level very little or fixed data such as a scale are repetitively printed. In such a case, those dots which are used frequently will deteriorate and thus a printed image will be irregular in density.

Figure 16:
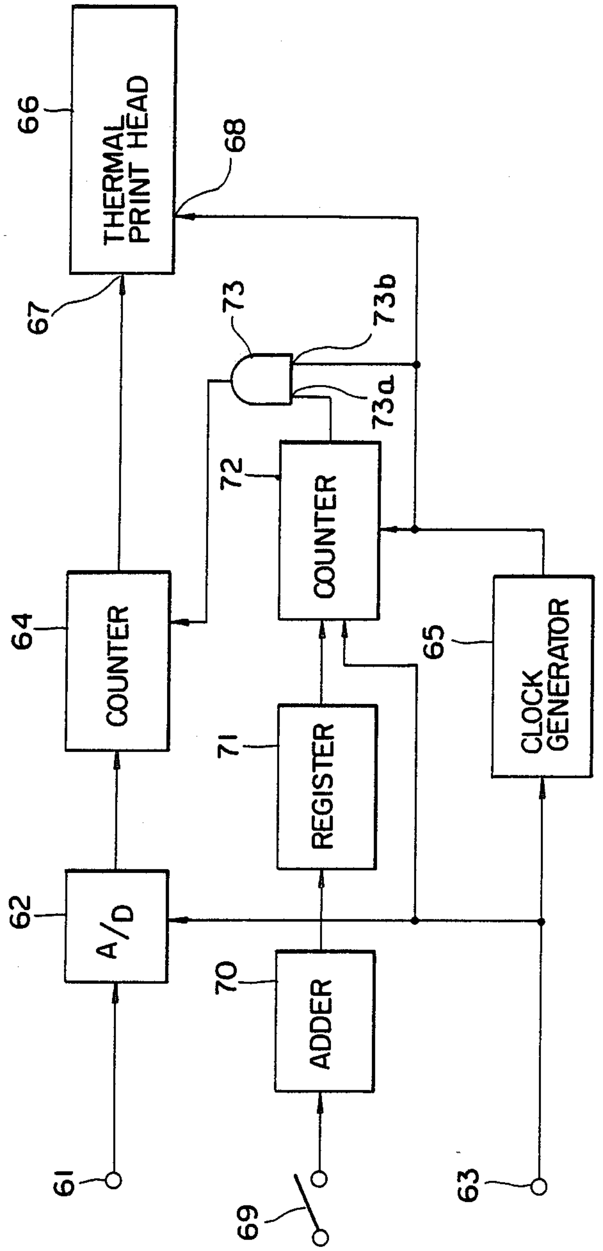
FIGS. 16 and 17 are block diagrams showing two alternatives of a thermal print head driving system constructed in accordance with still further embodiments of the present invention capable of prolonging the service life of a thermal print head.

In order to obviate the above-described disadvantages, the present invention provides a novel system for driving a thermal print head which is capable of making the frequency of use of each of a plurality of electrically resistive elements uniform irrespective of the nature of data to be printed. FIG. 16 shows in block form one embodiment of such a thermal print head driving system, and, as shown, the system includes an analog image signal input terminal 61 for receiving an analog image signal obtained by scanning an original, an A/D converter 62, a line sync signal input terminal 63 for receiving a line sycn signal, a counter 64, a clock generator 65, a switch 69, an adder 70, a register 71, another counter 72 and a AND gate 73. This driving system is connected to a thermal print head 66 which may be of the direct-drive type thermal print head as explained with respect to FIG. 3.

In operation, when an analog image signal is supplied to the A/D converter 62 via the input terminal 61, the analog image signal is converted into digital image data, which are then loaded into the counter 64 at the timing of the line sync signal which is also supplied to the A/D converter 62 via the other terminal 63. On the other hand, when the switch 69 is operated manually or electronically, the number of closures of the switch 69 is added to the contents of the register 71 by means of the adder 70, and the thus renewed contents of the register 71 are loaded into the counter 72 at the timing of the line sync signal. And, the counter 72 counts down in response to a clock signal supplied from the clock generator 65 in accordance with the line sync signal, and when the count of the counter 72 reaches "0", it supplies an output signal "1" to its output terminal which is connected to the input terminal 73*a* of the AND gate 73.

The AND gate 73 has its the other input terminal 73*b* connected to receive the clock signal from the clock generator 65 and its output terminal connected to a count down terminal of the counter 64, so that the counter 64 initiates its count down operation at the timing of the clock signal after the count of the counter 72 has become "0." When the count of the counter 64 has counted down to "0", it supplies an output signal "1" to its output terminal connected to the data input terminal of the thermal print head 66. On the other hand, the clock signal is also applied to the clock input terminal 68 of the thermal print head 66 to establish required timing between various components in the thermal print head 66. As described before, in the interior of the thermal print head 66, a plurality of electrically resistive elements are selectively activated in accordance with the sequence described with reference to FIG. 3 to carry out printing for a single line.

When the next line sync signal is supplied to the input terminal 63, a new output from the A/D converter 62 is loaded into the counter 64 and at the same time the value of the register 71 is reloaded into the counter 72. Thereafter, the counter 72 first counts down to "0" in association with the clock signal, and, then, the counter 64 counts down to "0." When the count of the counter 64 has become "0", an output signal "1" from the counter 64 is supplied to the data input terminal 67 of the thermal print head 66, so that printing for the next line is carried out in accordance with the sequence determined by the thermal print head 66. By repetitively carrying out such a printing operation for each line, a record chart with a printed image representing the input analog image may be obtained.

It is to be noted, however, that the signal supplied to the data input terminal 67 of the thermal print head 66 is a sum of an output from the A/D converter 62 and the value in the register 71. In other words, the printed image as a whole becomes shifted over a distance determined by the value of the register 71. Since "1" is added to the value of the register 71 each time when the switch 69 is depressed or closed, a base line for an image printed on a record chart will be shifted in the widthwise direction of the chart over a bit for each closure of the switch 69. As a result, the amount of shift depends upon the value of the register 71. Furthermore, if it is so structured that the value of 2 or more is added to the current value of register 71 each time when the switch 69 is closed, a base line will shift over a plurality of bits corresponding thereto.

Figure 17:
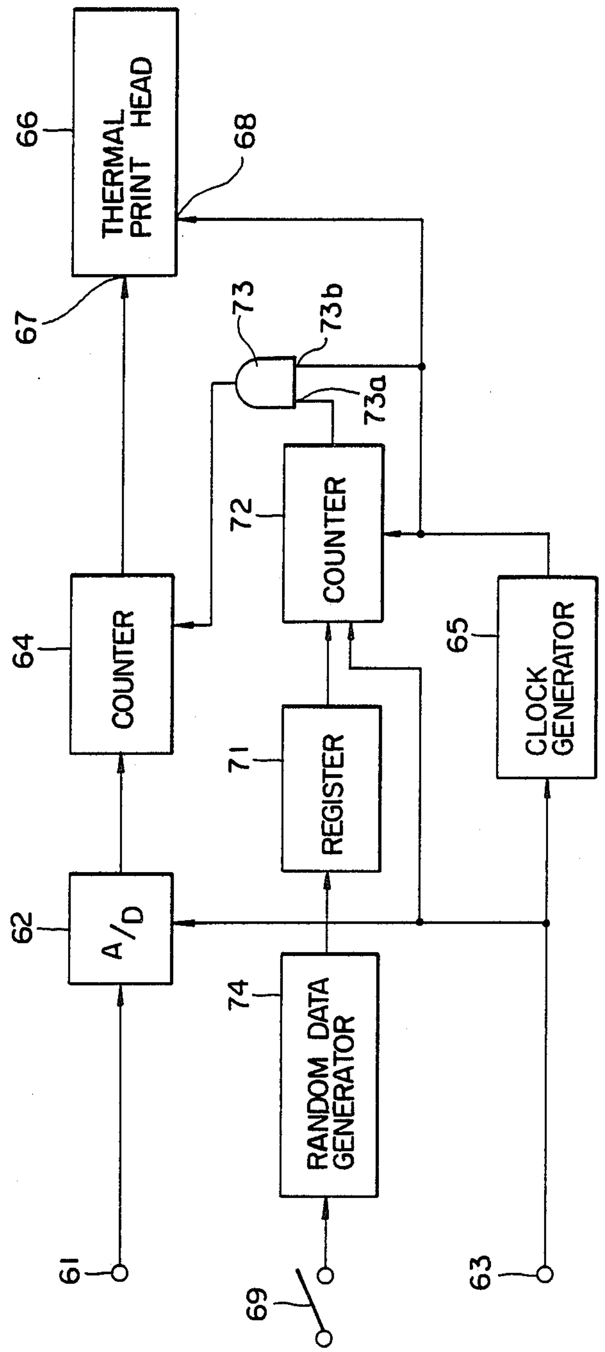

FIG. 17 shows in block form a modification of the above-described thermal print head driving system. In this embodiment, there is provided a random data generator 74 which supplies in response to a closure of the switch 69 a random data which is then set into the register 71. Accordingly, in this embodiment, a base line will shift over a randomly determined amount every time when the switch 69 is closed. It is to be noted, however, that the range of random data supplied as an output from the random data generator 74 is previously determined and thus the amount of shift of a base line is also limited within a certain range.

Figure 18:
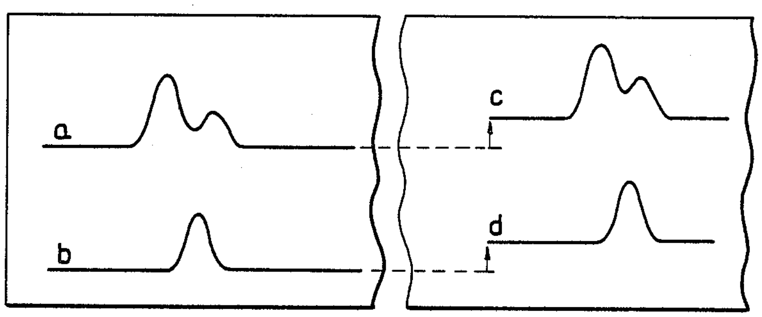
FIG. 18 is a schematic illustration showing one example of a printout produced by driving a thermal print head with either one of the embodiments shown in FIGS. 16 and 17.

FIG. 18 illustrates a record chart on which images are printed by the thermal print head 66 as driven by the present driving system. In FIG. 18, the left-hand half portion shows printed images a and b which do not deviate much from and tend to stay at their base lines. In such a situation, it is highly likely that particular dots are kept activated preferentially. However, in accordance with the present invention, as indicated in the right-hand half portion of FIG. 18, for a next batch of printing, images c and d are printed on the record chart with shifted base lines, so that printing dots or heat-producing elements may be presented for use with a substantially equal frequency. Since all of the printing dots are used equally frequently, their printing characteristics may be maintained uniform at all times thereby allowing to obtain a printed image of uniform density as well as to extend the service life of the thermal print head. It is to be noted that such a shift in base line may occur at a predetermined period. In this case, however, it is preferable that an indication mark be printed to indicate a shift in base line.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A system for driving a thermal print head including a plurality of heat-producing elements and storing means for temporarily storing data for one print line to be supplied to said plurality of heat-producing elements, said system comprising:

first means for forming inverted data by inverting the data of one print line read out of said storing means;

second means for (i) forming preheat control data by subjecting said inverted data to AND processing with corresponding data of a next following print line which immediately follows said one print line each time said inverted data has been formed by said first means and (ii) storing said preheat control data in said storing means; and means for supplying said preheat control data stored in said storing means to said plurality of heat-producing elements at predetermined timing.

2. A system of claim 1 wherein said storing means includes a shift register which has a capacity of storing digital image data for a single line and which supplies said digital image data to said plurality of heat-producing elements.

3. A system of claim 2 wherein said storing means further includes a latch having the capacity of storing said digital image data for a single line and connected as interposed between said plurality of heat-producing elements and said shift register.

4. A system of claim 2 wherein said first means includes a NAND gate having a first input terminal connected from a serial output terminal of said shift register, a second input terminal connected to receive an enable signal.

5. A system of claim 4 wherein said second means includes an AND gate having a first input terminal connected to the output terminal of said NAND gate, a second input terminal connected to receive said image data of said next print line and an output terminal connected to the input terminal of said shift register.

6. A system for driving a thermal print head including a plurality of electrically resistive elements arranged in the form of a single array, comprising:

a shift register having a capacity of storing binary data for a single line and having an input terminal for receiving data serially;

latch means interposed between said plurality of electrically resistive elements and said shift register for receiving said binary data from said shift register and transferring said binary data to said plurality of electrically resistive elements;

means for producing preheat data by comparing binary data of a current print line stored in said shift register with the corresponding binary data of a next print line which immediately follows said one print line and which is not stored in said shift register such that said preheat data is produced for the corresponding electrically resistive element if said corresponding electrically resistive element is to be activated in said next print line without having been activated in said current print line, said preheat data being stored into said shift register upon production; and control means for controlling the operation of said system such that said preheat data is transferred to said latch means in parallel at a predetermined timing.

7. A system of claim 6 is wherein said means for producing includes an inverter for inverting the binary image data of said current print line and an AND gate for receiving the thus inverted binary image data of said current print line and the binary image data of said next print line thereby carrying out AND processing between the inverted binary image data of said current print line and the binary image data of said next print line to produce said preheat data only when the AND condition is met.

8. A system of claim 7 wherein said inverter is comprised of a NAND gate having a first input terminal connected to a serial output terminal of said shift register, a second input terminal connected to receive an enable signal supplied from said control means and a output terminal connected to a first input terminal of said AND gate which has a second input terminal connected to receive the binary image data of said next following print line and an output terminal connected to said input terminal of said shift register.

9. A system of claim 8 further comprising additional storing means for temporarily storing the binary image data of said next print line when said binary image data is supplied to said shift register from said control means and switching means connected to receive said binary image data of said next print line from either said control means of said additional storing means and connected to supply its output to said second input terminal of said AND gate, said switching means being also connected to receive said enable signal whereby said switching means causes said binary image data to be supplied to said second input terminal of said AND gate from said control means if said enable signal indicates an enabled state and causes said binary image data to be supplied to said second input terminal of said AND gate from said addition storing means if said enable signal indicates a disabled state.

10. A system of claim 9 wherein said additional storing means includes a random access memory which receives a copy of said binary image data while said binary image data supplied to said second input terminal of said AND gate through said switching means from said control means.

* * * * *